UNITED STATES PATENT OFFICE.

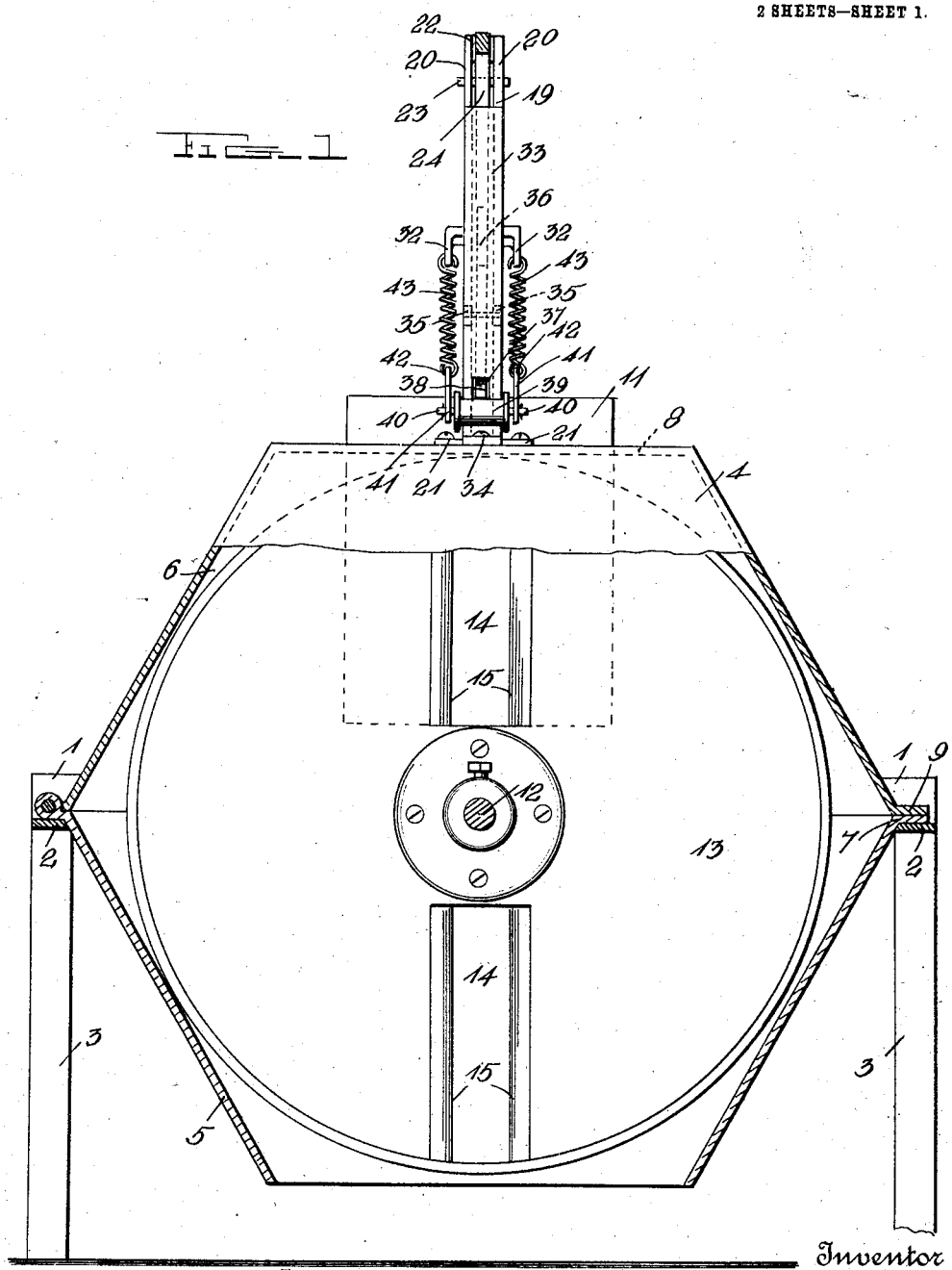

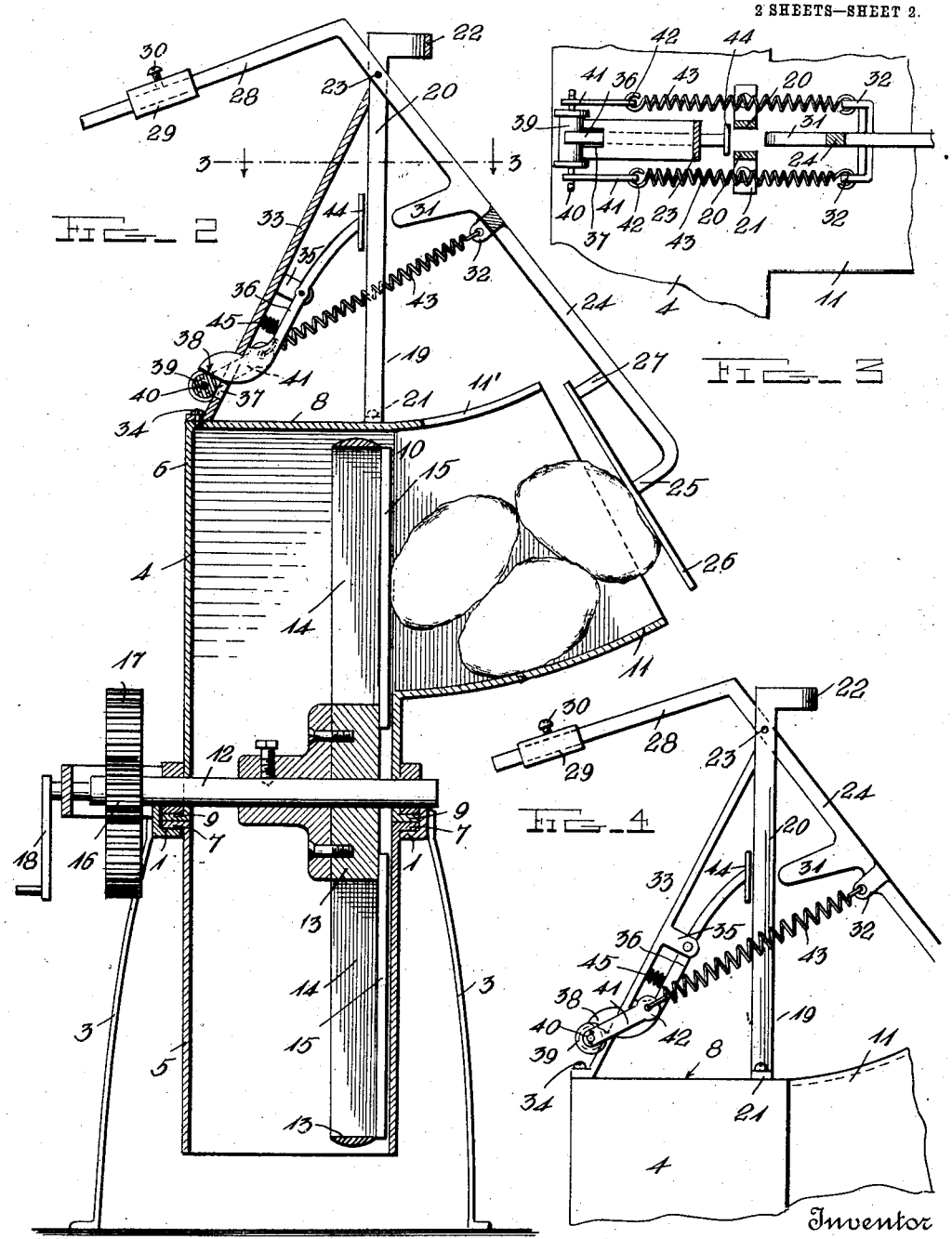

JOHN J. VAVRUSKA, OF CLEVELAND, OHIO.

VEGETABLE-SLICING MACHINE.

No. 905,960.      Specification of Letters Patent.      Patented Dec. 8, 1908.

Application filed March 26, 1908. Serial No. 423,408.

*To all whom it may concern:*

Be it known that I, JOHN J. VAVRUSKA, a citizen of the United States, residing at Cleveland, in the county of Cuyahoga and State of Ohio, have invented certain new and useful Improvements in Vegetable-Slicing Machines; and I do declare the following to be a full, clear, and exact description of the invention, such as will enable others skilled in the art to which it appertains to make and use the same.

This invention relates to new and useful improvements in vegetable slicing machines, more particularly to improvements in my vegetable slicing machine patented Feb. 4th, 1908, No. 878,436 and has for its object to provide a simple and economic device which will automatically press the material being sliced against the slicing knives until said material is used up when the material hopper will be automatically opened for the reception of new material or vegetables.

Another object is to provide an improvement of this kind which will be economic and efficient in action, which may be easily and cheaply manufactured and which will not get out of order.

Figure 1 is an end elevation of a vegetable slicer provided with the herein described improvement, the follower being shown out of the feed mouth or spout; Fig. 2 is a longitudinal sectional view; Fig. 3 is a detail horizontal sectional view taken on the line 3—3 of Fig. 1; and, Fig. 4 is a side elevation of the upper part of the machine.

The vegetable slicing machine to which the herein described improvements are attached is fully described in the above mentioned Letters-Patent and for that reason is not herein described with extreme particularity.

As shown in the drawings the supporting frame comprises side and end pieces 1 and 2, respectively. Supporting legs 3 are provided for said frame. The numeral 4 represents a flat casing of preferably hexagonal form comprising a lower inverted semi-hexagonal section 5 and an upper section 6. The lower section is opened at its bottom and is turned outwardly at its upper side and end edges to provide supporting flanges 7, adapted to engage the side and end pieces of the supporting frame and support the lower section in position below the frame.

The upper section is closed at its top or upper end by a wall 8 and is provided at its lower side and end edges with outwardly extending flanges 9 to correspond with the outwardly extending flanges of said lower section. Said upper section is hingedly connected at one of its bottom ends to said lower section so that it may be swung open to gain access to the interior of the casing. The front side of said upper section is also provided with a suitable feed opening 10 and a feed hopper 11 extends outwardly from said side and surrounds said feed opening. An axle 12 is journaled to said supporting frame transversely of the machine and has adjustably fixed near its front end a cutting disk 13 having elongated diametrically opposite slots or openings 14 extending in its face at points near its center, and two cutting knives 15 preferably of substantially rectangular form are bolted or otherwise removably secured to the front face of said cutting disk and extend a suitable distance over the slots or openings therein. A pinion 16 is rigidly fixed to the rear end of said axle and is adapted to mesh with a drive gear 17 fixed to a shaft journaled near the rear side of the machine in any suitable manner and provided with a suitable crank 18 for turning it. A standard 19 comprises vertically oppositely disposed arms 20 and is suitably secured to said upper section by means of the angular portion 21. Said standards are suitably spaced apart, as shown, in Fig. 3, and are connected at their upper ends by the curved brace 22. Slightly below the upper ends of said standards is the horizontally extending shaft 23, upon which is pivotally mounted the follower bar 24. The lower end of the follower bar is inwardly curved as at 25 and is provided with the follower 26 which may be provided with an additional brace 27 to securely fasten the same to said follower bar. The upper end of said follower bar is slightly downwardly bent as at 28 and is provided with a counter-balance 29 adjustably secured to said end portion 28 by means of a set screw 30. Intermediate said shaft and the portion 25, the follower bar is provided with an inwardly projecting lug or finger 31 and a pair of perforated ears 32. A track rod 33 is provided, suitably secured to the wall 8 as at 34. The upper end of said track rod is secured between said standards 20. Intermediate the ends of said track rod are provided spaced perforated lugs 35 between which is pivotally mounted the pawl 36, the lower end of which projects through a slot 37 in the lower end of said track rod and is provided with a downwardly disposed shoulder 38, the purpose of which will appear hereinafter.

A grooved wheel or spool 39 is provided to ride up and down upon the track rod 33. Said wheel is provided with a spindle 40 to each end of which is rigidly secured a guide piece 41, which serves not only to help retain the wheel upon the track rod but is provided with a perforated rearward projection 42 in the perforation of which is secured one end of a retractile coiled spring 43, the other end of said spring being secured to the perforations 32. The upper end of the pawl 36 is provided with a bearing portion 44 adapted to be contacted by the finger 31 when the follower is nearly in contact with said cutting knives. A spring 45 holds the lower end of the pawl yieldably projecting through said slot 37.

The operation of my device is as follows. The follower being out of the spout, the material or vegetables to be cut are placed in the spout and the wheel 39 is carried down over the end of the pawl 36 and into engagement with the shoulder 38. The springs 43 are then under tension and yieldably press the follower toward the cutting blades. The cutting operation is now continued until nearly all of the material in the spout is cut. As the material is being cut, the follower gradually moves toward the cutting blades and the finger 31 in it touches the bearing portion 44. The parts are so designed that the bearing portion 44 is engaged by the projection 31 at the time when nearly all of the material in the hopper is exhausted. The pawl is thus operated and the roller 39 released is permitted to travel up the guide rod 33 and release the tension upon the follower rod 24. This relieves the roller 39 which rises to upper position. The spring 43 is then under insufficient tension to overcome the counter-balance 29, which then drops and raises the follower out of the hopper in position for more material to be added.

Having thus described my invention, what I claim as new and desire to secure by U. S. Letters-Patent is:—

1. In combination with a vegetable cutter, a hopper, a follower bar pivoted to move in said hopper, a spring having one end secured to said follower bar, a pawl upon which the other end of said spring may be fastened means carried by the follower bar and adapted to act on the pawl to remove the other end of the spring therefrom when said follower bar reaches a predetermined position, and means to return the follower bar to normal.

2. In combination, a vegetable cutter having a casing, and a hopper, a pair of standards mounted upon said casing, a follower bar pivotally mounted between said standards, a follower on one end of said follower bar, and a counter balance on the other end, a finger between the pivot point of said follower bar and said follower, a track rod secured to said standard and to said casing, said track rod being provided with a slot in the lower end thereof, a pawl pivotally secured to said track rod, the lower end of said pawl being adapted to project through said slot and form a shoulder, the other end of said pawl being adapted to be contacted by said finger, a spool adapted to ride up and down upon said track rod, said spool being provided with a shaft, guides secured to said shaft, and springs connected with said guides and said follower.

In testimony whereof I have hereunto set my hand in presence of two subscribing witnesses.

JOHN J. VAVRUSKA.

Witnesses:
JOHN SEGER,
ALBERT VAVRUSKA.